(12) United States Patent
Zhang et al.

(10) Patent No.: US 11,211,654 B2
(45) Date of Patent: Dec. 28, 2021

(54) BATTERY MODULE (71) Applicant: JIANGSU CONTEMPORARY AMPEREX TECHNOLOGY LIMITED, Changzhou (CN)

(72) Inventors: Hua Zhang, Zhangzhou (CN); Feng Qin, Zhangzhou (CN); Peng Wang, Zhangzhou (CN); Zhiyi You, Zhangzhou (CN); Liangyi Wang, Zhangzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 157 days.

(21) Appl. No.: 16/558,355

(22) Filed: Sep. 3, 2019

(65) Prior Publication Data

US 2020/0411808 A1 Dec. 31, 2020

(30) Foreign Application Priority Data

Jun. 28, 2019 (CN) .......................... 201921005395.9

(51) Int. Cl.
*H01M 50/172* (2021.01)
*H01M 50/147* (2021.01)
*H01M 8/0202* (2016.01)
*H01M 8/04007* (2016.01)
*H01M 8/04537* (2016.01)

(52) U.S. Cl.
CPC ....... *H01M 50/172* (2021.01); *H01M 8/0202* (2013.01); *H01M 8/04067* (2013.01); *H01M 8/04544* (2013.01); *H01M 50/147* (2021.01)

(58) Field of Classification Search
CPC .......... H01M 8/0202; H01M 8/04067; H01M 8/04544; H01M 50/147; H01M 50/172
USPC ........................................................ 429/178
See application file for complete search history.

(56) References Cited

U.S. PATENT DOCUMENTS

| 2011/0027634 A1 | 2/2011 | Kishimoto et al. |
| 2014/0193680 A1 | 7/2014 | Lee et al. |
| 2016/0043448 A1 | 2/2016 | Fritz |

OTHER PUBLICATIONS

The Extended European Search Report for European Patent Application No. 19194376.0, dated Mar. 4, 2020, 7 pages.

*Primary Examiner* — James M Erwin
(74) *Attorney, Agent, or Firm* — Tucker Ellis LLP (57) ABSTRACT

The present disclosure relates to the technical field of energy storage devices, and in particular, to a battery module. The battery module includes a set of batteries, a case receiving the set of batteries, and a sampling unit for collecting a voltage signal and a temperature signal of the set of batteries. The sampling unit is provided with a connector, and a stopper for fixing the connector is formed on the case. By forming the stopper on the case, the connector can be directly assembled to the stopper during assembling process of the set of batteries without the need to fix the connector by glue or bolt connection. Therefore, not only an assembling process is simplified, but also the connector is not easily damaged during the assembling process.

5 Claims, 11 Drawing Sheets

BATTERY MODULE

CROSS-REFERENCE TO RELATED APPLICATIONS

The present application claims priority to Chinese Patent Application No. 201921005395.9 filed on Jun. 28, 2019, the content of which is incorporated herein by reference in its entirety.

TECHNICAL FIELD

The present disclosure relates to the technical field of energy storage devices, and in particular, to a battery module.

BACKGROUND

An energy storage system of a new energy vehicle is a set of batteries having a large capacity and including a plurality of battery units connected in series or in parallel. Since the set of batteries generates heat during operation, a sampling unit is usually provided to detect heat and voltage of the set of batteries.

The sampling unit is usually connected to an external monitoring device through a connector fixed to the sampling unit. In the prior art, the connector is fixed to a case of the battery module by glue or bolt connection, the connector will be easily damaged during assembling of the case or the connector cannot be smoothly plugged and unplugged.

SUMMARY

The present disclosure provides a battery module, so as to solve the problem in the prior art and improve reliability of assembly of the connector on the sampling unit.

The present disclosure provides a battery module, including:
 a set of batteries;
 a case for receiving the set of batteries; and
 a sampling unit configured to collect a voltage signal and a temperature signal of the set of batteries,
 the sampling unit is arranged on the set of batteries, and the sampling unit is provided with a connector; and
 a stopper for fixing the connector is formed on the case.

In an embodiment, the case includes a lower case, and the lower case is provided with a connector outlet;
 the stopper includes a first stopper and a second stopper;
 the first stopper and the second stopper are configured to limit the connector in a first direction;
 the first stopper is formed by a side of the lower case located at two ends of the connector outlet; and
 the second stopper is a first reinforcing rib directly formed on an inner wall of the lower case.

In an embodiment, the stopper further includes a third stopper and a fourth stopper;
 the third stopper and the fourth stopper are configured to limit the connector in a second direction;
 each of the third stopper and the fourth stopper is a stopping plate directly formed on the lower case.

In an embodiment, the stopper further includes a fifth stopper and a sixth stopper;
 the fifth stopper and the sixth stopper are configured to limit the connector in a third direction;
 the fifth stopper is formed by the inner wall of the lower case; and
 the sixth stopper is a buckle located at an end of the stopping plate facing away from the inner wall of the lower case.

In an embodiment, the stopper further includes a third stopper and a fourth stopper;
 the third stopper and the fourth stopper are configured to limit the connector in a second direction;
 each of the third stopper and the fourth stopper is a second reinforcing rib directly formed on the inner wall of the lower case.

In an embodiment, the stopper further includes a fifth stopper and a sixth stopper;
 the case further includes a top cover, and the set of batteries is received in a space formed by the top cover and the lower case;
 the fifth stopper and the sixth stopper are configured to limit the connector in a third direction;
 the fifth stopper is formed by the inner wall of the lower case; and
 the sixth stopper is a stopping plate formed on the top cover and protruding towards the lower case.

In an embodiment, the sixth stopper is provided with a reinforcing rib.

In an embodiment, the stopper includes a reinforcing rib directly formed on the case.

In an embodiment, the stopper includes a stopping plate directly formed on the case.

In an embodiment, the stopper further includes a buckle located at an end of the stopping plate facing away from an inner wall of the case.

The technical solution provided by the present disclosure can achieve the following beneficial effects.

The battery module provided by the present disclosure includes a set of batteries, a case receiving the set of batteries, and a sampling unit configured to collect a voltage signal and a temperature signal of the set of batteries. The sampling unit is provided with a connector, and stopper for fixing the connector is formed on the case. By forming the stopper on the case, the connector can be directly assembled to the stopper during assembling of the set of batteries without the need to fix the connector by glue or bolt connection. Therefore, not only an assembling process is simplified, but also the connector is not easily damaged during the assembling process.

It should be understood that the foregoing general description and the following detailed description are merely exemplary and are not intended to limit the present disclosure.

BRIEF DESCRIPTION OF DRAWINGS

In order to better illustrate technical solutions in embodiments of the present disclosure, the accompanying drawings used in the embodiments are briefly introduced as follows. It should be noted that the drawings described as follows are merely a part of the embodiments of the present disclosure, other drawings can also be acquired by those skilled in the art without paying creative efforts.

REFERENCE SIGNS

1—battery module;
11—set of batteries;
12—case;
  121—lower case;
    121a—connector outlet;
  122—top cover;
  123—stopper;
    123a—first stopper;
    123b—second stopper;
    123c—third stopper;
    123d—fourth stopper;
    123e—fifth stopper;
    123f—sixth stopper;
13—sampling unit;
  131—connector;
2—battery module;
21—set of batteries;
22—case;
  221—lower case;
    221a—connector outlet;
  222—top cover;
  223—stopper;
    223a—first stopper;
    223b—second stopper;
    223c—third stopper;
    223d—fourth stopper;
    223e—fifth stopper;
    223f—sixth stopper;
23—sampling unit;
  231—connector.

The drawings herein are incorporated into and constitute a part of the present specification, illustrate embodiments of the present disclosure and explain principles of the present disclosure together with the specification.

DESCRIPTION OF EMBODIMENTS

The technical solutions in the embodiments of the present disclosure are described in the following with reference to the accompanying drawings. It should be noted that, the described embodiments are merely exemplary embodiments of the present disclosure, which shall not be interpreted as providing limitations to the present disclosure. All other embodiments obtained by those skilled in the art according to the embodiments of the present disclosure without creative efforts are within the scope of the present disclosure.

Figure 1:
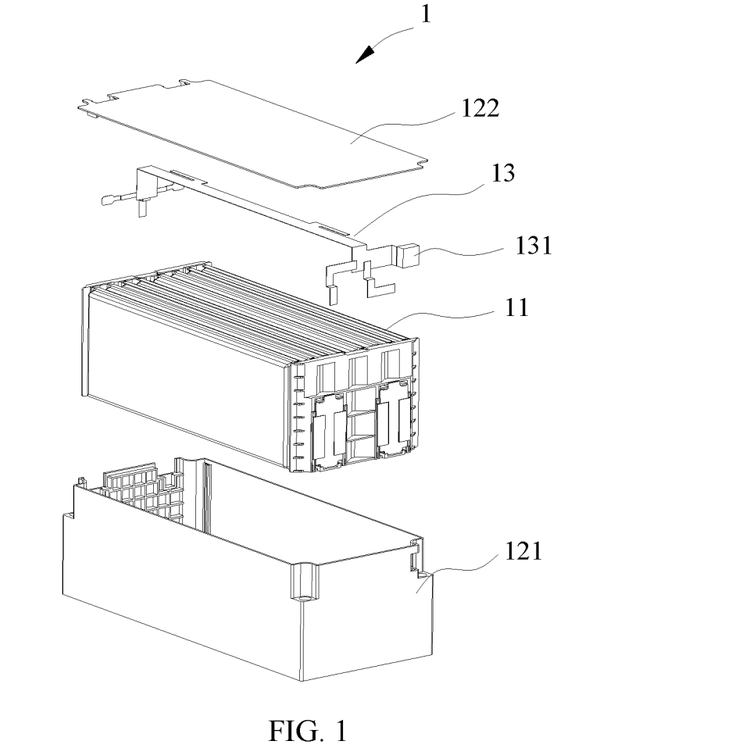
FIG. 1 is a schematic exploded view of a structure of a battery module according to a first embodiment of the present disclosure.
Figure 2:
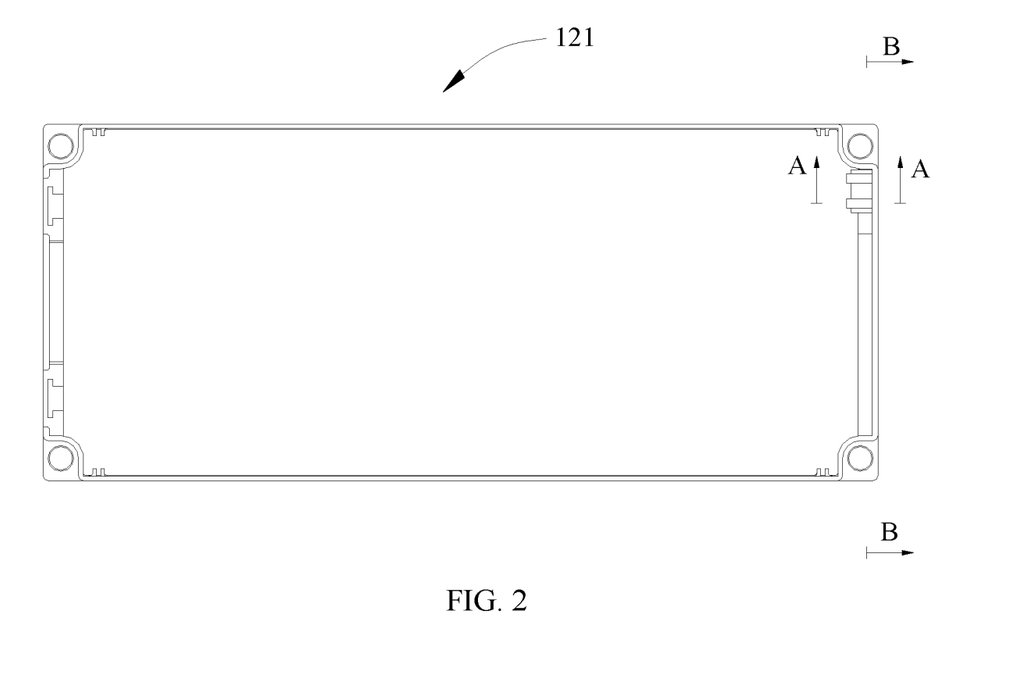
FIG. 2 is a top view of a structure of a lower case of the battery module according to the first embodiment of the present disclosure.

FIG. 1 is a schematic exploded view of a structure of a battery module according to a first embodiment of the present disclosure, and FIG. 2 is a top view of a structure of a lower case of the battery module according to the first embodiment of the present disclosure.

In the first embodiment of the present disclosure, a battery module 1 is provided. The battery 1 includes a set of batteries 11, a case 12 for receiving the set of batteries 11, and a sampling unit 13 for collecting a voltage signal and a temperature signal of the set of batteries 11.

The case 12 may include a lower case 121 and a top cover 122. The set of batteries 11 includes a plurality of battery units, and the plurality of battery units is connected in series or in parallel to form the set of batteries 11. Each of the battery units includes an electrode assembly that electrochemically reacts with an electrolyte to output electrical energy. A large amount of heat is generated during repeated charging and discharging processes, and if the heat is not dissipated in time, safety performance of the battery will be affected. Therefore, the temperature and voltage of the set of batteries are collected by the sampling unit 13, so that the set of batteries can be monitored.

The sampling unit 13 is arranged on the set of batteries 11, and the sampling unit 13 is provided with a connector 131 to transmit the collected temperature signal and voltage signal to an exterior of the battery module 1.

Figure 3:
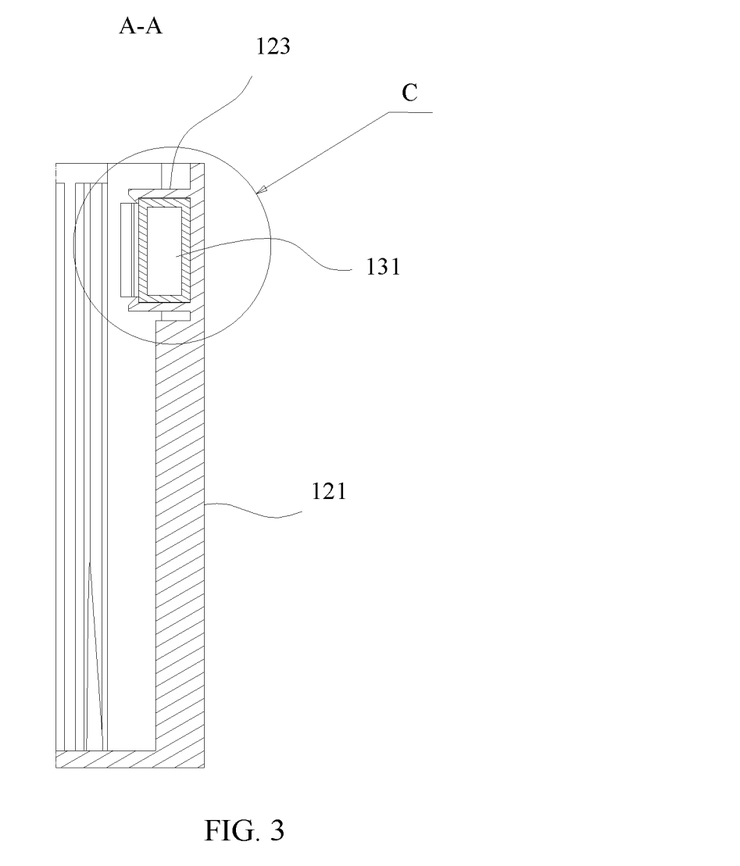
FIG. 3 is a cross-sectional view taken along line A-A of FIG. 2.
Figure 4:
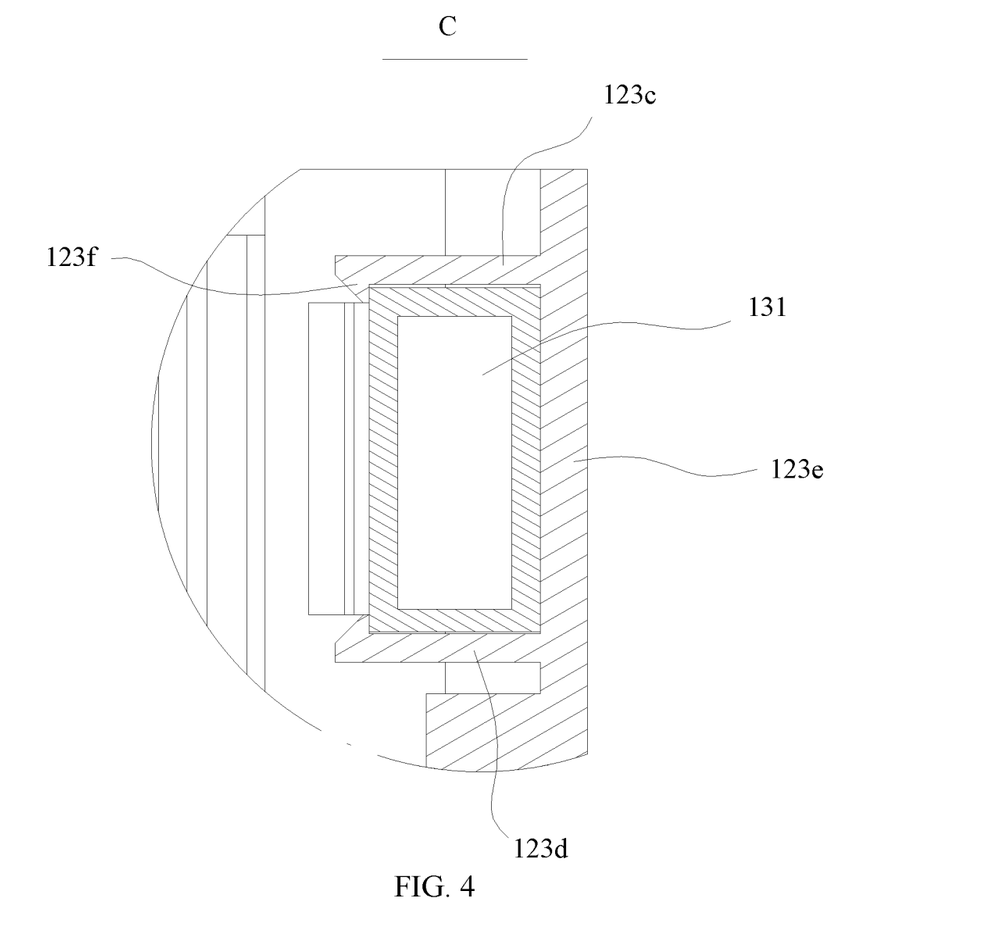
FIG. 4 is an enlarged view of a portion C of FIG. 3.
Figure 5:
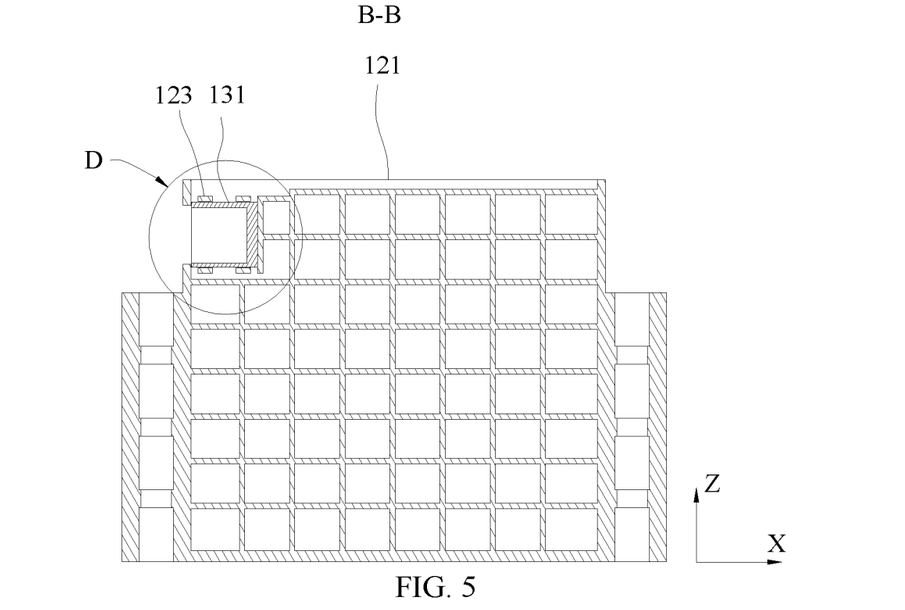
FIG. 5 is a cross-sectional view taken along line B-B of FIG. 2.
Figure 6:
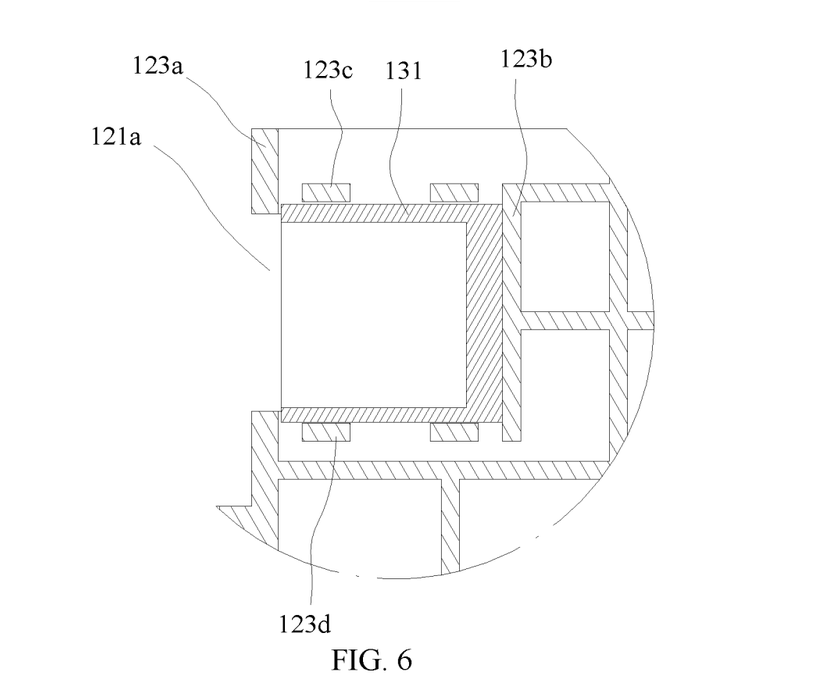
FIG. 6 is an enlarged view of a portion D of FIG. 5.
Figure 7:
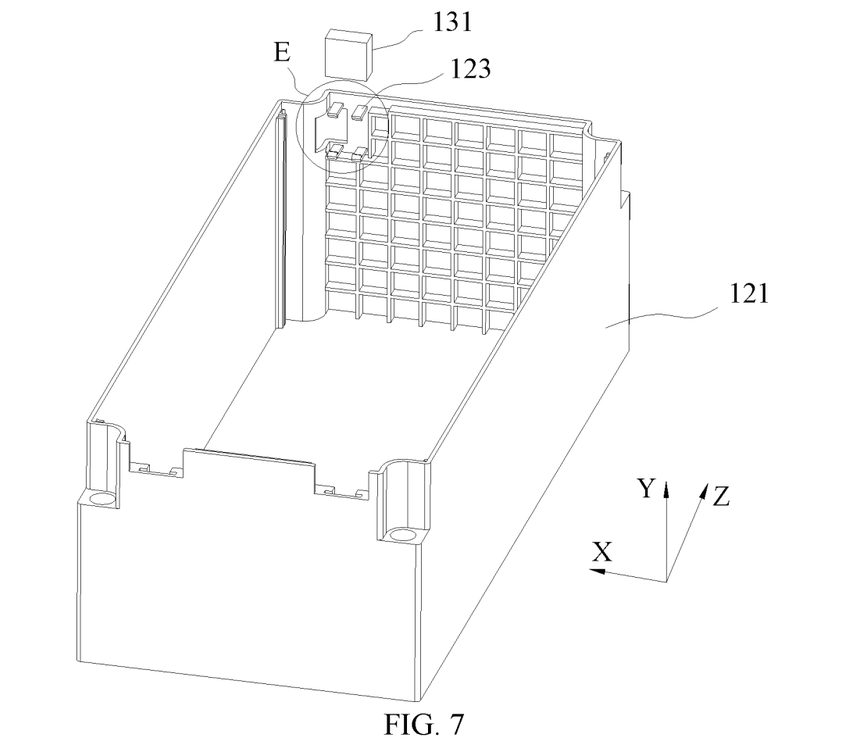
FIG. 7 is a schematic diagram illustrating matching between a lower case and a connector.
Figure 8:
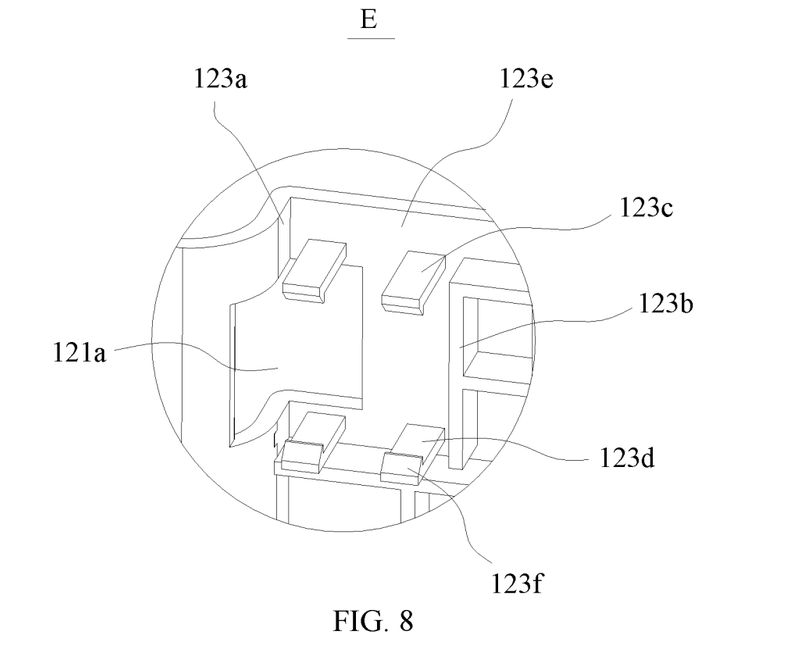
FIG. 8 is an enlarged view of a portion E of FIG. 7.

FIG. 3 is a cross-sectional view taken along line A-A of FIG. 2; FIG. 4 is an enlarged view of a portion C of FIG. 3; FIG. 5 is a cross-sectional view taken along line B-B of FIG. 2; FIG. 6 is an enlarged view of a portion D of FIG. 5; FIG. 7 is a schematic diagram illustrating matching between a lower case and a connector; and FIG. 8 is an enlarged view of a portion E of FIG. 7.

As shown from FIG. 3 to FIG. 8, a stopper 123 is formed on the case 12, and the connector 131 is fixed to the case 12 by the stopper 123.

By forming the stopper 123 on the case 12, the connector 131 can be directly assembled to the stopper 123 during assembling of the set of batteries without the need to fix the connector 131 by glue or bolt connection. Therefore, not only an assembling process is simplified, but also the connector will not be easily damaged during the assembling process. The case 12 does not need to be provided with a mounting hole, and the connector 131 can be directly plugged and unplugged.

In an implementation manner, the case 12 may include a lower case 121 and a top cover 122, and the set of batteries 11 is received in a space enclosed by the lower case 121 and the top cover 122. The sampling unit 13 is located at an upper end of the set of batteries 11. The connector 131 is arranged at both ends of the sampling unit 13. The case 12 is provided with a connector outlet 121a (in this embodiment, the connector outlet 121a is arranged on the lower case 121, referring to FIG. 8), and an output terminal of the connector 131 is led out from the connector outlet 121a to the exterior of the battery module 1.

The connector 131 is a substantially hexahedral structure having degrees of freedom in six directions. The structure of the connector 131 is the same as those in the prior art, and details thereof are not described herein. The connector 131 is connected to a monitoring device at the exterior of the battery module 1 through the output terminal.

The stopper 123 may be arranged on the lower case 121 or on the top cover 122, or may be arranged on both the lower case 121 and the top cover 122.

With reference to FIG. 4 to FIG. 8, the above-mentioned stopper 123 includes a first stopper 123a and a second stopper 123b, which are configured to limit the connector 131 in a first direction. In this embodiment, the first direction is a length direction of the connector 131, and is also a width direction of the lower case 121 (i.e., X direction shown in FIG. 7). Specifically, as shown in FIG. 8, the first stopper 123a is located at a side of the lower case 121 at two ends of the connector outlet 121a (upper and lower ends of the connector outlet 121a show in FIG. 8); and the second stopper 123b is a first reinforcing rib directly formed on an inner wall of the lower case 121. In order to increase strength of the lower case 121, a reinforcing rib is usually provided on the lower case 121. A part of the reinforcing rib directly serves as the above-mentioned second stopper 123b, which not only simplifies the process, but also does not require an additional fixing member to fix the connector 131, thereby reducing space and increasing an energy density of the battery module 1.

The stopper 123 further includes a third stopper 123c and a fourth stopper 123d, which are configured to limit the connector 131 in a second direction. In this embodiment, the second direction is a width direction of the connector 131, and is also a height direction of the lower case 121 (i.e., Y direction shown in FIG. 7). Specifically, as shown in FIG. 8, the third stopper 123c and the fourth stopper 123d are both stopping plates directly formed on the lower case 121. In this embodiment shown in FIG. 8, two third stoppers 123c and two fourth stoppers 123d are provided. In other embodiments, each of the third stopper 123c and the fourth stopper 123d may be a one-piece structure, or the third stopper 123c and the fourth stopper 123d may be reinforcing ribs formed on the case body 121. In a case where the third stopper 123c and the fourth stopper 123d are stopping plates directly formed on the lower case 121, elasticity thereof will be better. In an assembling process of the connector 131, there is enough deformation space, so that the connector 131 can be assembled more smoothly.

Further, the stopper 123 further includes a fifth stopper 123e and a sixth stopper 123f, which are configured to limit the connector 131 in a third direction. In this embodiment, the third direction is a thickness direction of the connector 131, and is also a length direction of the lower case 121 (i.e., Z direction shown in FIG. 7). Specifically, as shown in FIG. 8, the fifth stopper 123e is an inner wall of the lower case 121, and the sixth stopper 123f is a buckle located at an end of the stopping plate facing away from the inner wall of the lower case 121. The buckle and the stopping plate can be formed in one piece, the structure is simple and can be easily formed, and an assembling process of the connector 131 is simple and smooth.

Figure 9:
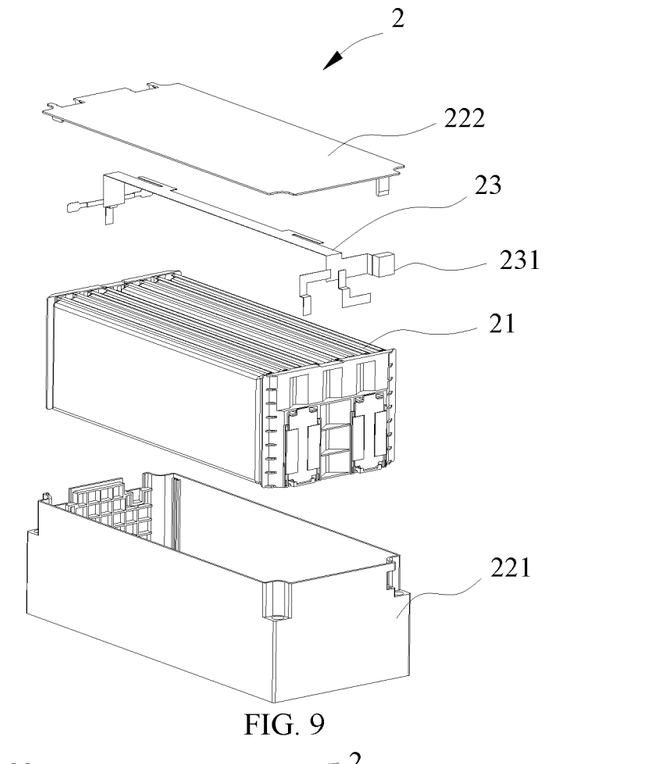
FIG. 9 is a schematic exploded view of a structure of a battery module according to a second embodiment of the present disclosure.
Figure 10:
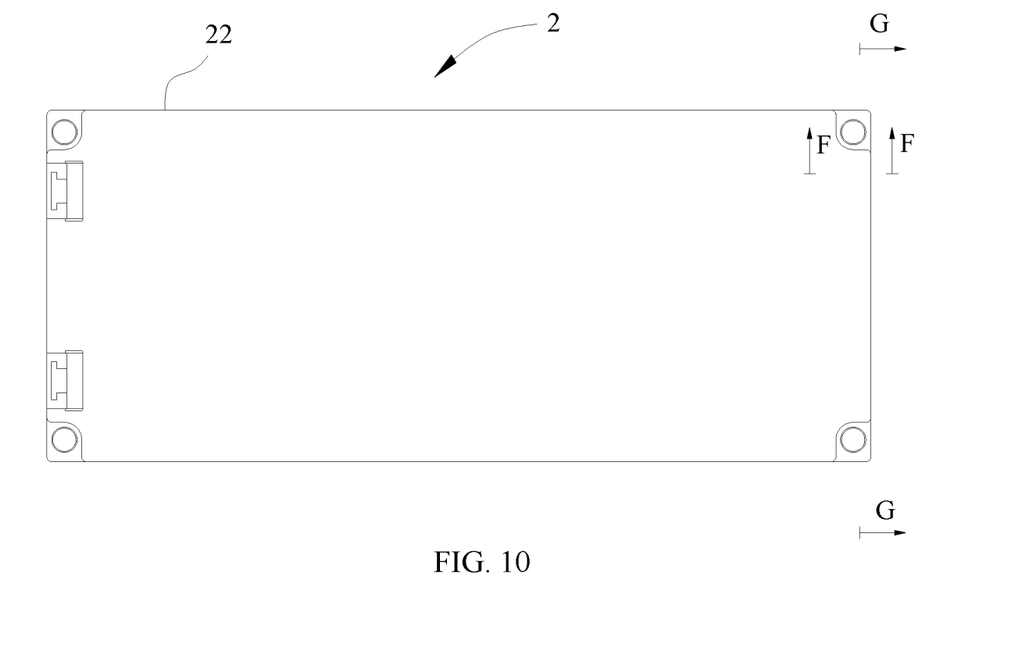
FIG. 10 is a top view of a structure of the battery module according to the second embodiment of the present disclosure.

FIG. 9 is a schematic exploded view of a structure of a battery module according to a second embodiment of the present disclosure, and FIG. 10 is a top view of a structure of a lower case of the battery module according to the second embodiment of the present disclosure.

In the second embodiment of the present disclosure, a battery module 2 is provided. The battery module 2 includes a set of batteries 21, a case 22 for receiving the set of batteries 21, and a sampling unit 23 for collecting a voltage signal and a temperature signal of the set of batteries 21.

The case 22 may include a lower case 221 and a top cover 222. The set of batteries 21 includes a plurality of battery units, and the plurality of battery units are connected in series or in parallel to form the set of batteries 21. Each of the batteries includes an electrode assembly that electrochemically reacts with an electrolyte to output electrical energy. A large amount of heat is generated during repeated charging and discharging processes, and if the heat is not dissipated in time, safety performance of the battery will be affected. Therefore, the temperature and voltage of the set of batteries are collected by the sampling unit 23, so that the set of batteries can be monitored.

The sampling unit 23 is arranged on the set of batteries 21, and the sampling unit 23 is provided with a connector 231 to transmit the collected temperature signal and voltage signal to an exterior of the battery module 2.

Figure 11:
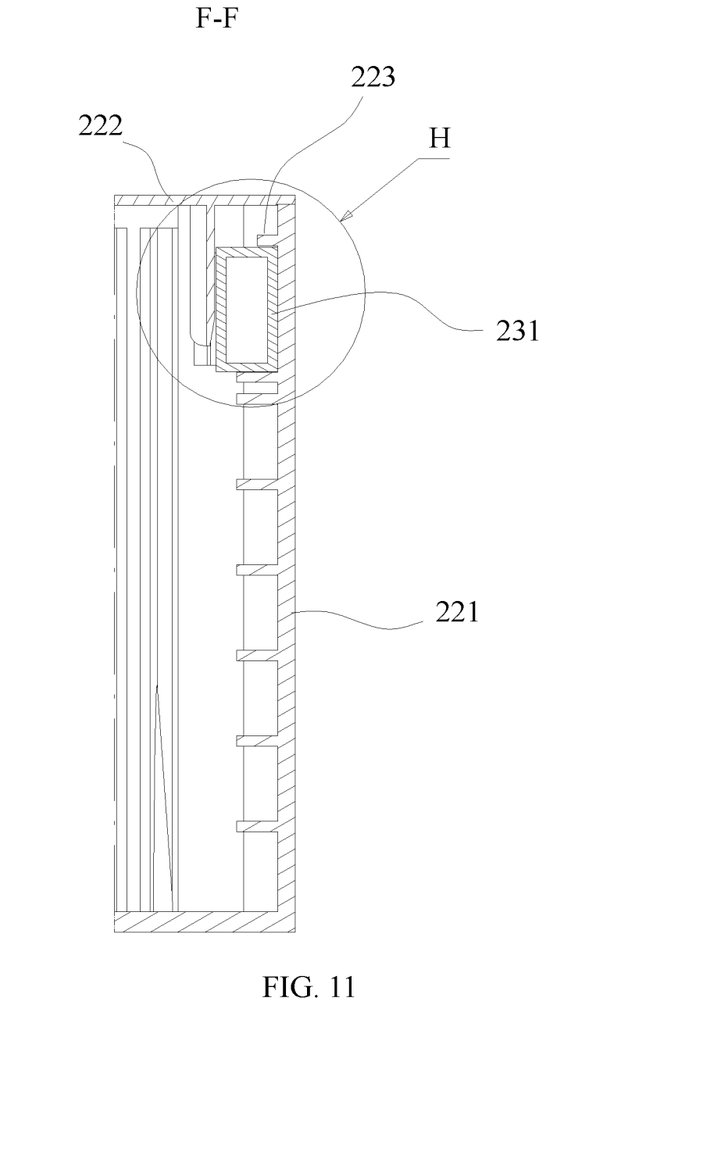
FIG. 11 is a cross-sectional view taken along line F-F of FIG. 10.
Figure 12:
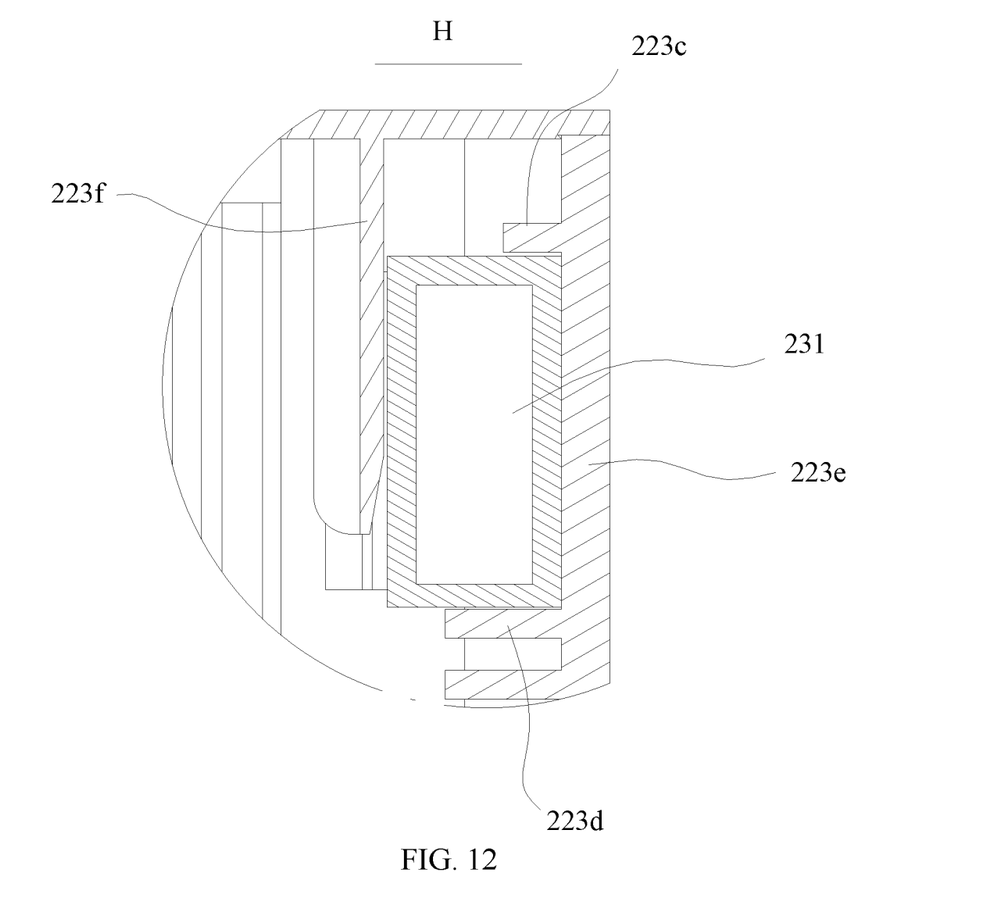
FIG. 12 is an enlarged view of a portion H of FIG. 11.

FIG. 11 is a cross-sectional view taken along line F-F of FIG. 10, and FIG. 12 is an enlarged view of a portion H of FIG. 11. A stopper 223 is formed on the case 22, and the connector 231 is fixed to the case 22 by the stopper 223.

By forming the stopper 223 on the case 22, the connector 231 can be directly assembled to the stopper 223 during assembling of the set of batteries without the need to fix the connector 231 by glue or bolt connection. Therefore, not only an assembling process is simplified, but also the connector will not be easily damaged during the assembling process. The case 22 does not need to be provided with a mounting hole, and the connector 231 can be directly plugged and unplugged.

Figure 15:
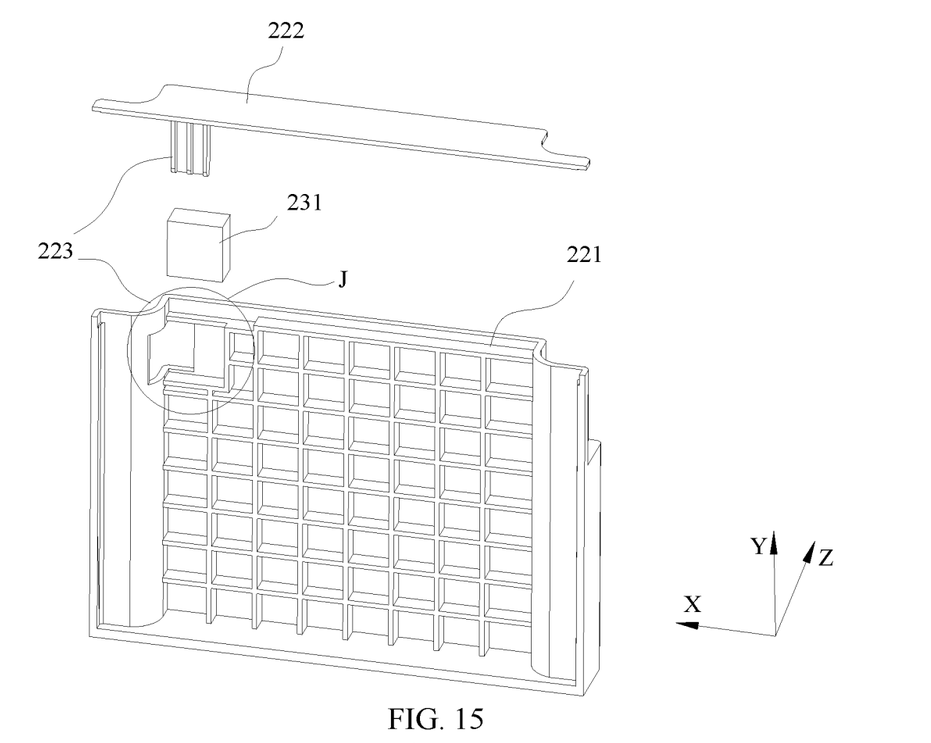
FIG. 15 is a schematic diagram illustrating matching between a lower case and a connector.

As shown in FIG. 9 and FIG. 10, the case 22 includes a lower case 221 and a top cover 222. The set of batteries 21 is received in a space enclosed by the lower case 221 and the top cover 222. The lower case is provided with a connector outlet 221a (as shown in FIG. 15).

Figure 13:
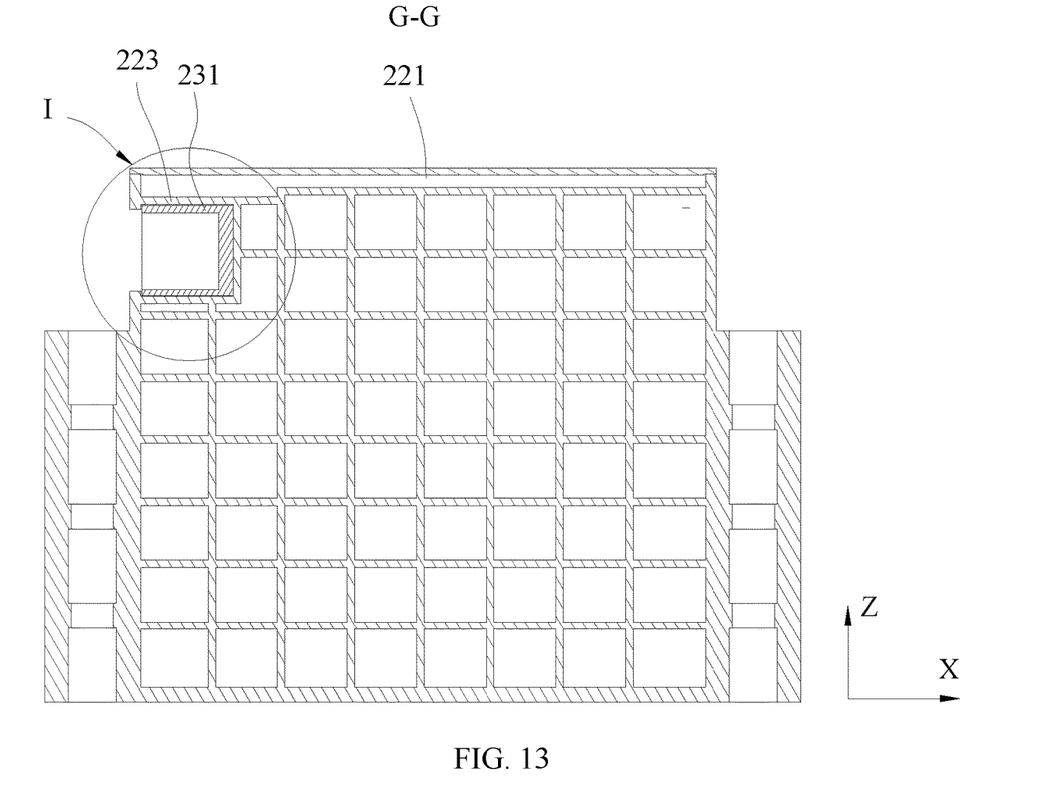
FIG. 13 is a cross-sectional view taken along line G-G of FIG. 10.
Figure 14:
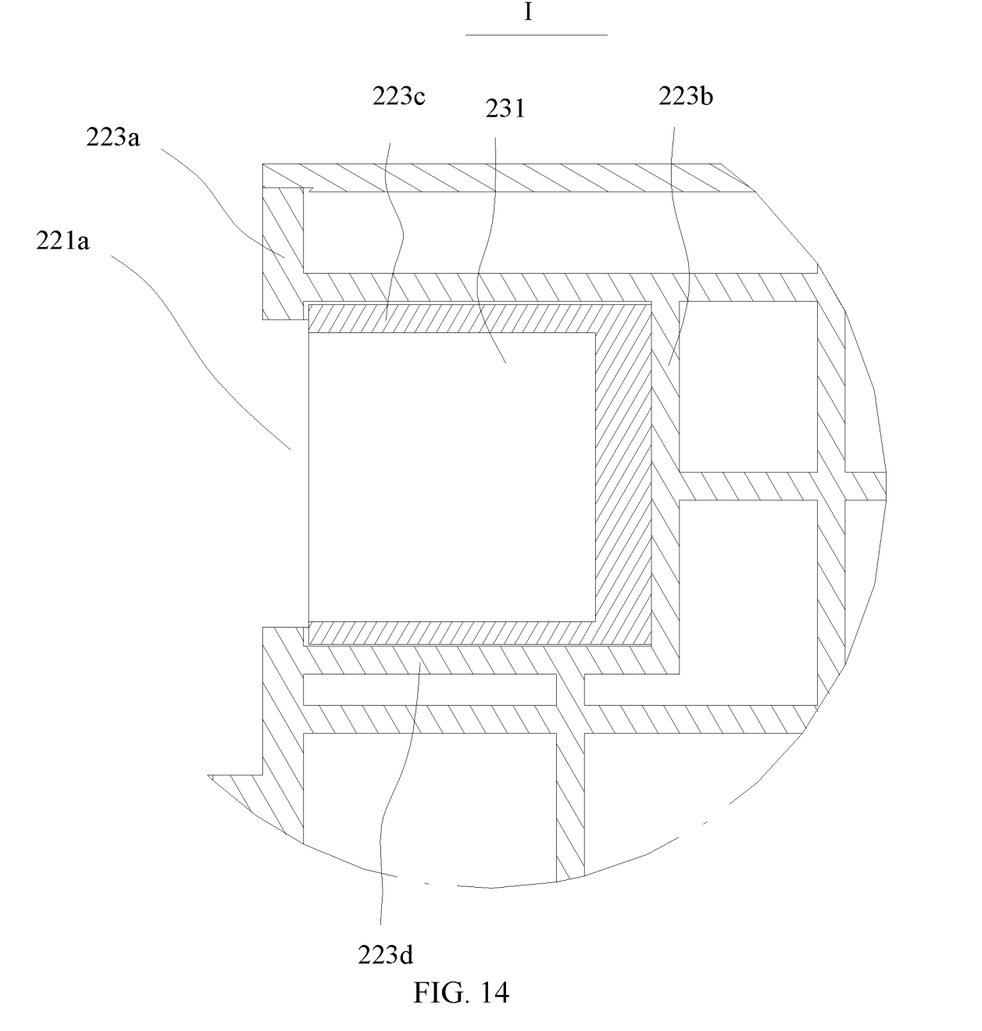
FIG. 14 is an enlarged view of a portion I of FIG. 13.
Figure 16:
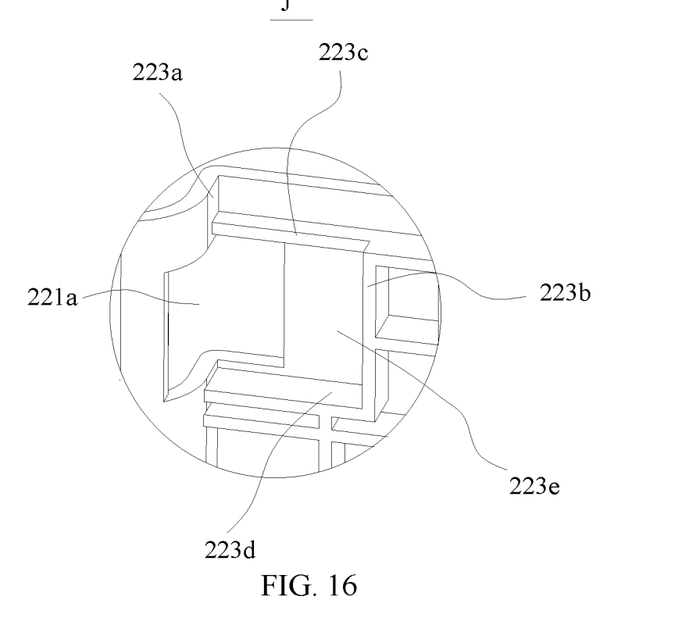
FIG. 16 is an enlarged view of a portion J of FIG. 15.

FIG. 13 is a cross-sectional view taken along line G-G of FIG. 10; FIG. 14 is an enlarged view of a portion I of FIG. 13; FIG. 15 is a schematic diagram illustrating matching between a lower case and a connector; and FIG. 16 is an enlarged view of a portion J of FIG. 15.

With reference to FIG. 12 to FIG. 16, the above-mentioned stopper 223 includes a first stopper 223a and a second stopper 223b. The first stopper 223a and the second stopper 223b are configured to limit the connector 231 in a first direction. In this embodiment, the first direction is a length direction of the connector 231, and is also a width direction of the lower case 221 (i.e., X direction shown in FIG. 15). Specifically, the first stopper 223a is located at a side of the lower case 221 at two ends of the connector outlet 221a (upper and lower ends of the connector outlet 221a show in FIG. 16); and the second stopper 123b is a first reinforcing rib directly formed on an inner wall of the lower case. In order to increase strength of the lower case 221, a reinforcing rib is usually provided on the lower case 221. A part of the reinforcing rib directly serves as the above-mentioned second stopper 223b, which not only simplifies the process, but also does not require an additional fixing member to fix the connector 231, thereby reducing space and increasing an energy density of the battery module 2.

The stopper 223 further includes a third stopper 223c and a fourth stopper 223d, which are configured to limit the connector 231 in a second direction. In this embodiment, the second direction is a width direction of the connector 231, and is also a height direction of the lower case 221 (i.e., Y direction shown in FIG. 15). Specifically, the third stopper 223c and the fourth stopper 223d are both second reinforcing ribs directly formed on the inner wall of the lower case. A part of the reinforcing ribs formed on the lower case 221 directly serves as the above-mentioned third stopper 223c and fourth stopper 223d, which not only simplifies the process, but also does not require an additional fixing member to fix the connector 231, thereby reducing space and increasing the energy density of the battery module 2.

Further, the stopper 223 further includes a fifth stopper 223e and a sixth stopper 223f, which are configured to limit the connector 231 in a third direction. In this embodiment, the third direction is a thickness direction of the connector 231, and is also a length direction of the lower case 221 (i.e., Z direction shown in FIG. 15). Specifically, the fifth stopper 223e is an inner wall of the lower case 221, and the sixth stopper 223f is a stopping plate formed on the top cover 222 which extends toward the lower case 221 (with reference to FIG. 12 and FIG. 15). During assembling of the connector 232, the connector 231 may be pre-fixed to the lower case 221 by the first stopper 223a, the second stopper 223b, the third stopper 223c, the fourth stopper 223d, and the fifth stopper 223e, and then the top cover 222 is assembled. The sixth stopper 223f formed on the top cover 222, i.e., the stopping plate, is inserted from top to the bottom to be located at an side of the connector 231, thereby limiting degrees of freedom of the connector 231 in the Z direction.

In an embodiment, the sixth stopper 223f is provided with a reinforcing rib to reinforce the sixth stopper 223f, so as to prevent the sixth stopper 223f from being damaged during the assembling process.

In a preferred implementation manner, the stopper 123 includes reinforcing ribs that are directly formed on the case. Specifically, the degrees of freedom of the connector 131 in six directions may be all limited by the reinforcing ribs. Taking the lower case 121 as an example, the lower case 121 is generally provided with reinforcing ribs for reinforcing the strength of the lower case, and a pair of parallel reinforcing ribs can limit the degree of freedom of the connector 131 in one direction. In a case where the reinforcing ribs formed on case 12 directly serve as the stopper, it does not require an additional structure or member, thereby reducing space and increasing the energy density of the battery module.

In an embodiment, the stopper 123 may also include stopping plates directly formed on the case 12. Specifically, the degrees of freedom of the connector 131 in six directions may all be limited by the stopping plates. Taking the lower case 121 as an example, the stopping plates and the lower case 121 may be formed in one piece. A pair of stopping plates are formed at suitable positions to match a position of the connector 131, thereby limiting the degree of freedom of the connector 131 in one direction. The stopping plate has better elasticity and thus can allow the connector to have enough deformation space during assembling of the connector, so that the assembling is smoother.

A buckle may be provided at an end of the stopping plate facing away from an interior of the case 12, thereby limiting the degree of freedom of the connector 131 in another direction. The buckle and the above-mentioned stopping plate may be formed in one piece. During assembling of the connector, the degree of freedom can be limited in two directions, and the structure is simple and is easily assembled.

The above-described embodiments are merely preferred embodiments of the present disclosure and are not intended to limit the present disclosure. Various changes and modifications can be made to the present disclosure by those skilled in the art. Any modifications, equivalent substitutions and improvements made within the principle of the present disclosure shall fall into the protection scope of the present disclosure.

What is claimed is:

1. A battery module, comprising:
   a set of batteries;
   a case for receiving the set of batteries; and
   a sampling unit configured to collect a voltage signal and a temperature signal of the set of batteries,
   wherein the sampling unit is arranged on the set of batteries, and the sampling unit is provided with a connector; and
   a stopper for fixing the connector within a space formed by the case and is formed on an inner wall within the case,
   wherein the case comprises a lower case, and the lower case is provided with a connector outlet;
   the stopper comprises a first stopper and a second stopper;
   the first stopper and the second stopper are configured to limit the connector in a first direction;
   the first stopper is formed by a side of the lower case located at two ends of the connector outlet; and
   the second stopper is a first reinforcing rib directly formed on an inner wall of the lower case,
   wherein the stopper further comprises a third stopper and a fourth stopper;
   the third stopper and the fourth stopper are configured to limit the connector in a second direction; and
   each of the third stopper and the fourth stopper is a second reinforcing rib directly formed on the inner wall of the lower case,
   wherein the stopper further comprises a fifth stopper and a sixth stopper;
   the case further comprises a top cover, and the set of batteries is received in a space formed by the top cover and the lower case;
   the fifth stopper and the sixth stopper are configured to limit the connector in a third direction;
   the fifth stopper is formed by the inner wall of the lower case; and
   the sixth stopper is a stopping plate formed on the top cover and protruding towards the lower case.

2. The battery module according to claim 1, wherein the sixth stopper is provided with a reinforcing rib.

3. The battery module according to claim 1, wherein the stopper further comprises a reinforcing rib directly formed on the case.

4. The battery module according to claim 1, wherein the stopper further comprises a stopping plate directly formed on the case.

5. The battery module according to claim 4, wherein the stopper further comprises a buckle located at an end of the stopping plate, and the end is facing away from the inner wall of the case.

* * * * *